US012675436B1

(12) United States Patent
Raju et al.

(10) Patent No.: US 12,675,436 B1
(45) Date of Patent: Jul. 7, 2026

(54) LIGHTWEIGHT CONSOLIDATION OPERATION FOR STORAGE SPACE RECLAMATION

(71) Applicant: Rubrik, Inc., Palo Alto, CA (US)

(72) Inventors: Naveen Raju, Bengaluru (IN); Vaiapuri Ramasubramaniam, Bengaluru (IN); Sarat Kallepalli, Bengaluru (IN); Sayantan Jana, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/012,770

(22) Filed: Jan. 7, 2025

(51) Int. Cl.
 *G06F 16/11* (2019.01)
 *G06F 16/16* (2019.01)
(52) U.S. Cl.
 CPC ............. *G06F 16/128* (2019.01); *G06F 16/11* (2019.01); *G06F 16/162* (2019.01)
(58) Field of Classification Search
 CPC ...... G06F 16/128; G06F 16/162; G06F 16/11; G06F 16/1727; G06F 16/1752; G06F 16/178; G06F 16/183
 USPC ........................................................ 707/649
 See application file for complete search history.

(56) References Cited

U.S. PATENT DOCUMENTS

| | | | | |
|---|---|---|---|---|
| 2019/0034507 A1* | 1/2019 | Duttagupta | ......... | G06F 16/1752 |
| 2021/0311835 A1* | 10/2021 | Futey | .................... | G06F 16/178 |
| 2022/0237151 A1* | 7/2022 | Regni | ................... | G06F 16/183 |
| 2022/0241756 A1* | 8/2022 | Hu | .......................... | C23C 18/02 |
| 2022/0374519 A1* | 11/2022 | Botelho | .............. | G06F 11/1464 |
| 2023/0350764 A1* | 11/2023 | Karthik | ............... | G06F 11/1451 |
| 2025/0117361 A1* | 4/2025 | Jana | ...................... | G06F 16/128 |

* cited by examiner

*Primary Examiner* — Shahid A Alam
(74) *Attorney, Agent, or Firm* — Holland Hart LLP

(57) ABSTRACT

Methods, systems, and devices for data management are described. A data management system (DMS) may perform a lightweight consolidation operation on an expired snapshot rather than a full consolidation operation that merges the expired snapshot into another snapshot based on one or more snapshot heuristics. The lightweight consolidation operation may delete data that is not shared with (e.g., referenced by, relied upon by) any subsequent incremental snapshot without reading all of the data within the snapshot and without deleting the expired snapshot or writing data into a new file. The DMS may perform a full consolidation operation if a quantity of leaked space satisfies a threshold. Additionally, or alternatively, the DMS may perform the full consolidation operation if a snapshot chain length exceeds a threshold and if performing the full consolidation operation would reduce the used space by a threshold quantity.

17 Claims, 9 Drawing Sheets

300

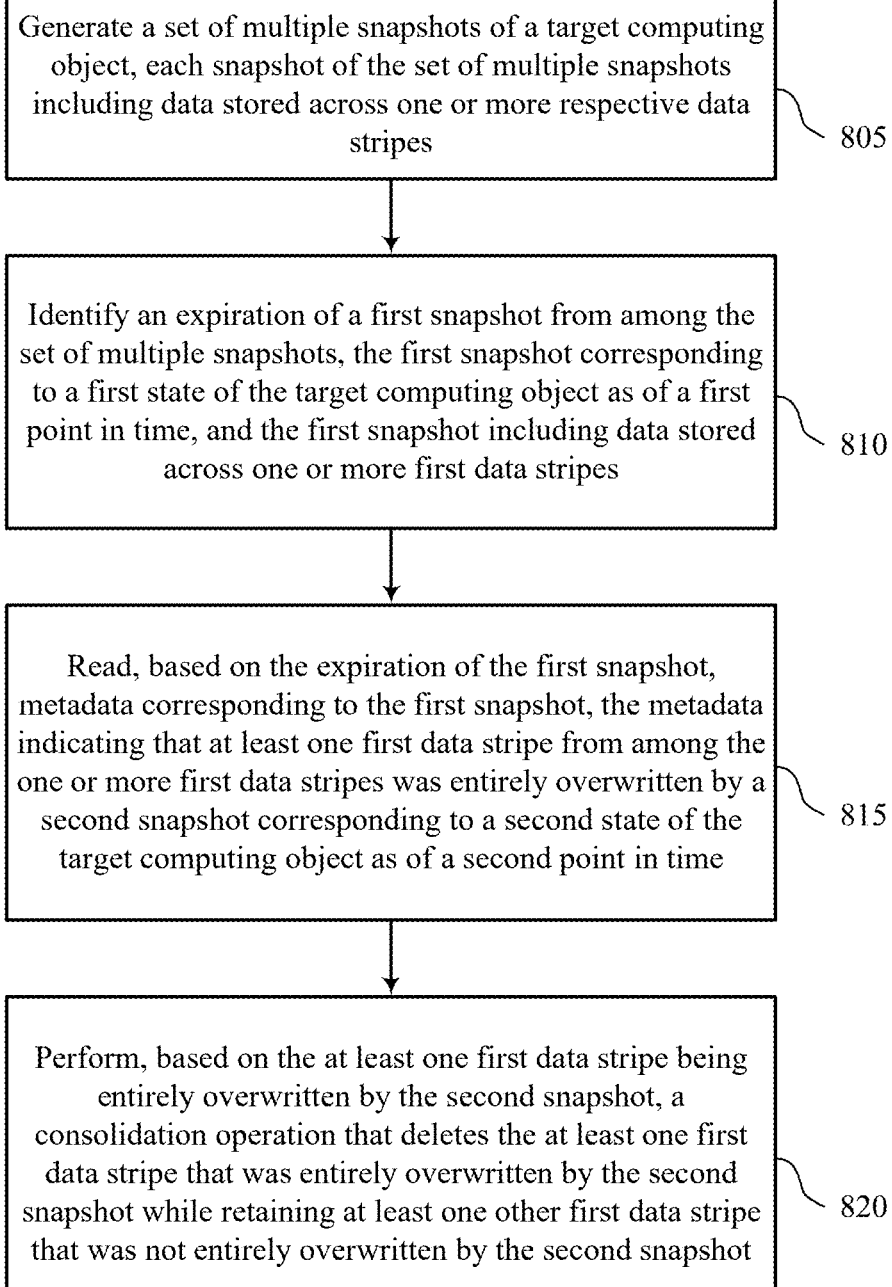

Generate a set of multiple snapshots of a target computing object, each snapshot of the set of multiple snapshots including data stored across one or more respective data stripes

805

Identify an expiration of a first snapshot from among the set of multiple snapshots, the first snapshot corresponding to a first state of the target computing object as of a first point in time, and the first snapshot including data stored across one or more first data stripes

810

Read, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time

815

Perform, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot

Figure 9:
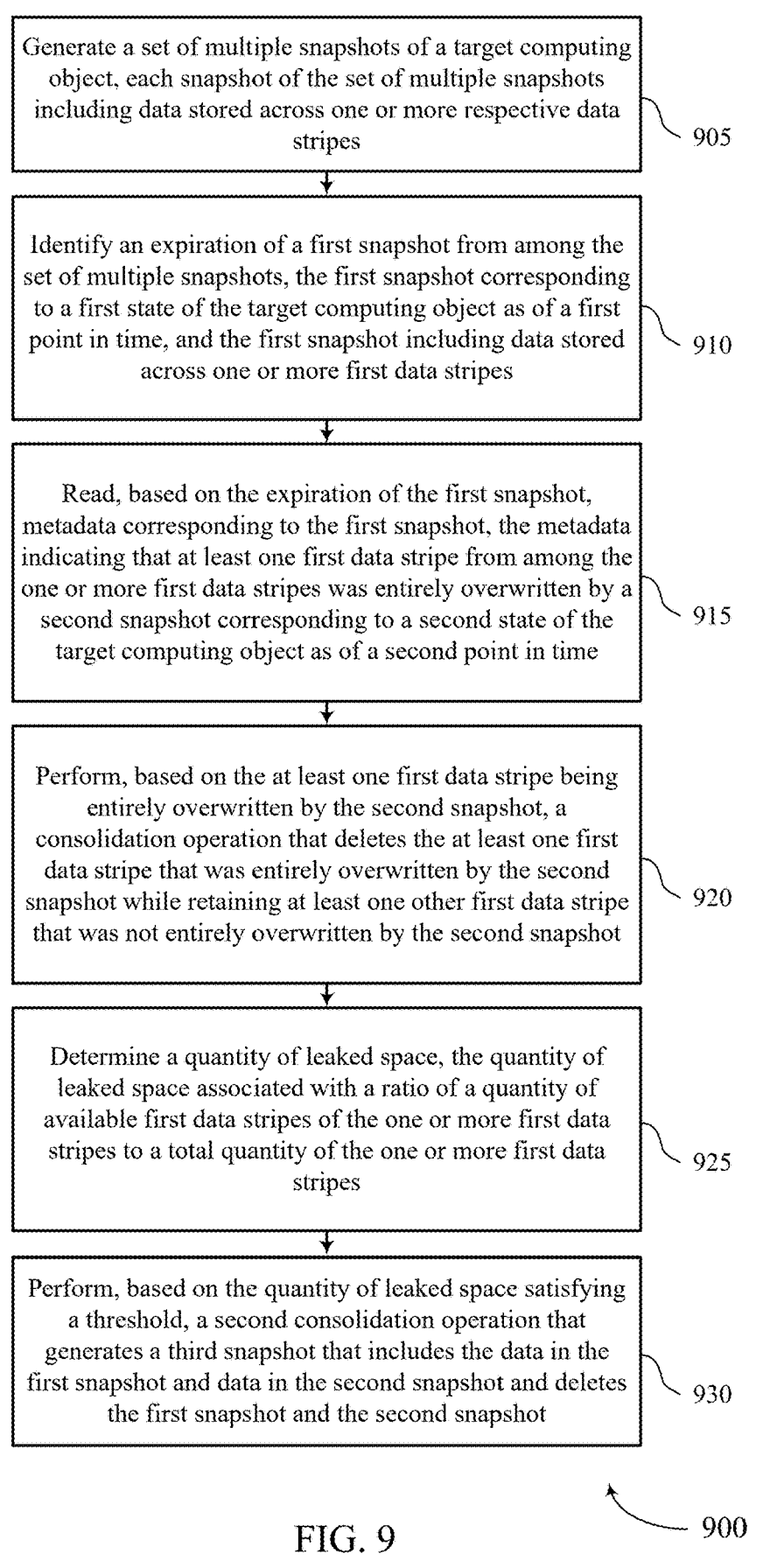

Generate a set of multiple snapshots of a target computing object, each snapshot of the set of multiple snapshots including data stored across one or more respective data stripes

~ 905

Identify an expiration of a first snapshot from among the set of multiple snapshots, the first snapshot corresponding to a first state of the target computing object as of a first point in time, and the first snapshot including data stored across one or more first data stripes

~ 910

Read, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time

~ 915

Perform, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot

~ 920

Determine a quantity of leaked space, the quantity of leaked space associated with a ratio of a quantity of available first data stripes of the one or more first data stripes to a total quantity of the one or more first data stripes

~ 925

Perform, based on the quantity of leaked space satisfying a threshold, a second consolidation operation that generates a third snapshot that includes the data in the first snapshot and data in the second snapshot and deletes the first snapshot and the second snapshot

LIGHTWEIGHT CONSOLIDATION OPERATION FOR STORAGE SPACE RECLAMATION

FIELD OF TECHNOLOGY

The present disclosure relates generally to data management, including techniques for lightweight consolidation operation for storage space reclamation.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 and 9 show flowcharts illustrating methods that support lightweight consolidation operation for storage space reclamation in accordance with aspects of the present disclosure.

DETAILED DESCRIPTION

Figure 1:
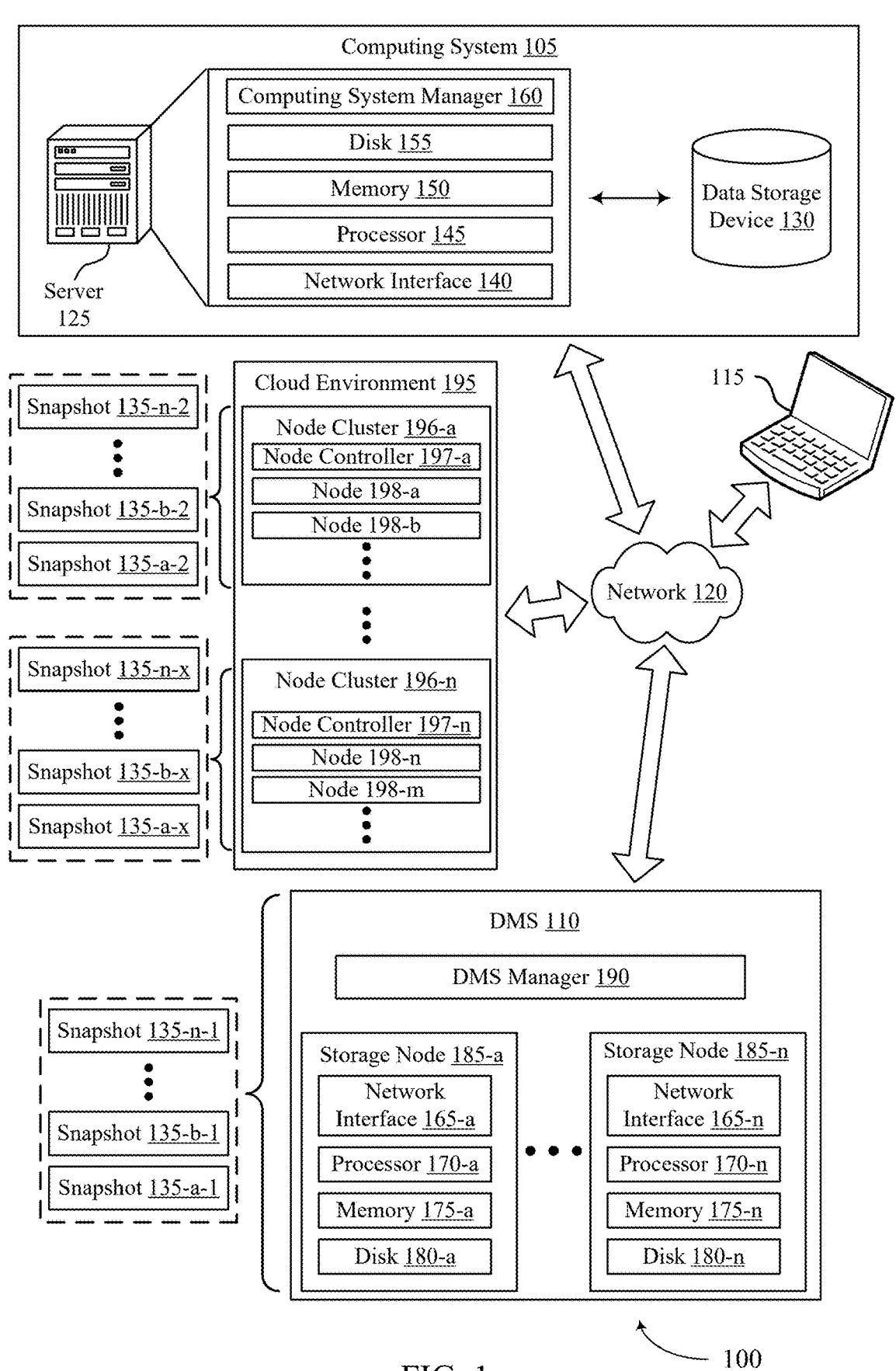
FIG. 1 illustrates an example of a computing environment that supports lightweight consolidation operation for storage space reclamation in accordance with aspects of the present disclosure.

Some data management systems (DMSs) may generate snapshots of a target computing object (e.g., a computing system or other type of computing object), where each snapshot may include data corresponding to a state of the target computing object at the time the snapshot was generated. A DMS may store the snapshots in a storage environment for a duration in accordance with an expiration cycle (e.g., a retention policy). When the duration expires for a respective snapshot, the snapshot may become an expired snapshot.

In some examples, a DMS may perform a full consolidation operation that merges an expired snapshot into another snapshot to create a new patch file, reclaim storage space, and improve performance. For example, when a first snapshot expires, the DMS may write data in the first snapshot that is shared with (e.g., referenced by, relied upon by) a second incremental snapshot, along with the data of the second snapshot, into a new patch file that may serve as a replacement for the second incremental snapshot. The first snapshot and the original patch file for the second snapshot may then be deleted, with the new patch file representing the consolidated version of the second snapshot. Data included in a snapshot may be distributed across one or more data stripes. A data stripe may be a set of physical blocks of data having a static physical size, where data blocks within the data stripe may be mapped to logical offsets within a logical address range, and where the span of corresponding logical addresses corresponding to the data blocks within a data stripe may vary between data stripes.

In some examples, a DMS may perform a full consolidation operation after each expiration cycle (e.g., every day, every week, every month, etc.). Performing the full consolidation operation for each expiration cycle may result in a considerable disk byte utilization (up to 70%) as the data in each snapshot may be read and written into the consolidated patch file. Accordingly, it may be beneficial to minimize the disk utilization caused by frequent full consolidation operations.

The techniques described herein support deferring the full consolidation operation for one or more expiration cycles based on one or more snapshot heuristics. That is, rather than perform a full consolidation operation after each expiration cycle, a DMS may instead perform one or more lightweight consolidation operations based on the one or more heuristics. A lightweight consolidation operation may read a metadata file (e.g., a patch file) of an expired snapshot, which may indicate the data stripe identifiers (IDs) in the expired snapshot that may be reachable (not overwritten by any subsequent snapshot), and delete all the unreachable stripes from the expired snapshot. In other words, the lightweight consolidation operation may delete the data that is not shared with any subsequent incremental snapshot without reading all of the data within the snapshot and without deleting the expired snapshot or writing data into a new file. In some examples, the DMS may attempt to perform the lightweight consolidation operation at each expiration cycle.

The DMS may determine whether to perform the full consolidation operation in connection with a snapshot expiration event. For example, some reachable stripes may include physical blocks that are unused, which may be referred to as leaked space. The quantity of leaked space in the storage environment may be updated and checked against a leaked space threshold. If the leaked space satisfies the threshold as of an expiration event, the DMS may perform the full consolidation operation. In some examples, if the leaked space does not satisfy the threshold, the DMS may perform the lightweight consolidation operation. Additionally, or alternatively, the DMS may perform the full consolidation operation if a snapshot chain length exceeds a threshold and if running the full consolidation operation would reduce the used space by a threshold quantity (e.g., if the chain length is >10 and would reduce used space by >30% by running the full consolidate operation). That is, the DMS may attempt to perform lightweight consolidation operations after each expiration cycle, and may perform a full consolidation operation if any of the trigger conditions (leaked space, chain length, storage space) are met as of a given expiration cycle.

FIG. 1 illustrates an example of a computing environment 100 that supports lightweight consolidation operation for storage space reclamation in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may perform a full consolidation operation that merges an expired snapshot 135 into another snapshot 135 to create a new patch file, reclaim storage space, and improve performance. For example, when a first snapshot 135 expires, the DMS 110 may write data in the first snapshot 135 that is shared with (e.g., referenced by, relied upon by) a second incremental snapshot 135, along with the data of the second snapshot 135, into a new patch file that may serve as a replacement for the second incremental snapshot 135. The first snapshot 135 and the original patch file for the second snapshot 135 may then be deleted, with the new patch file representing the consolidated version of the second snapshot 135. Data included in a snapshot 135 may be distributed across one or more data stripes. A data stripe may be a set of physical blocks of data having a fixed physical size, where data blocks within the data stripe may be mapped to logical offsets within a logical address range, and where the span of corresponding logical addresses corresponding to the data blocks within a data stripe may vary between data stripes.

In some examples, the DMS 110 may perform a full consolidation operation after each expiration cycle (e.g., every day, every week, every month, etc.). Performing the full consolidation operation for each expiration cycle may result in a considerable disk byte utilization (up to 70%) as the data in each snapshot may be read and written into the consolidated patch file. Accordingly, it may be beneficial to minimize the disk utilization caused by frequent full consolidation operations.

The techniques described herein support deferring the full consolidation operation for one or more expiration cycles based on one or more snapshot heuristics. That is, rather than perform a full consolidation operation after each expiration cycle, the DMS 110 may instead perform one or more lightweight consolidation operations based on the one or more heuristics. A lightweight consolidation operation may read a metadata file (e.g., a patch file) of an expired snapshot 135, which may indicate the data stripe IDs in the expired snapshot 135 that may be reachable (not overwritten by any subsequent snapshot 135), and delete all the unreachable stripes from the expired snapshot 135. In other words, the lightweight consolidation operation may delete the data that is not shared with any subsequent incremental snapshot 135 without reading all of the data within the snapshot 135 and without deleting the expired snapshot 135 or writing data into a new file. In some examples, the DMS 110 may attempt to perform the lightweight consolidation operation at each expiration cycle.

The DMS 110 may determine whether to perform the full consolidation operation in connection with a snapshot expiration event. For example, some reachable stripes may include physical blocks that are unused, which may be referred to as leaked space. The quantity of leaked space in the storage environment may be updated and checked against a leaked space threshold. If the leaked space satisfies the threshold as of an expiration event, the DMS 110 may perform the full consolidation operation. In some examples, if the leaked space does not satisfy the threshold, the DMS may perform the lightweight consolidation operation. Additionally, or alternatively, the DMS 110 may perform the full consolidation operation if a snapshot chain length exceeds a threshold and if running the full consolidation operation would reduce the used space by a threshold quantity (e.g., if the chain length is >10 and would reduce used space by >30% by running the full consolidate operation). That is, the DMS 110 may attempt to perform lightweight consolidation operations after each expiration cycle, and may perform a full consolidation operation if any of the trigger conditions (e.g., leaked space, chain length, storage space) are met as of a given expiration cycle.

Figure 2:
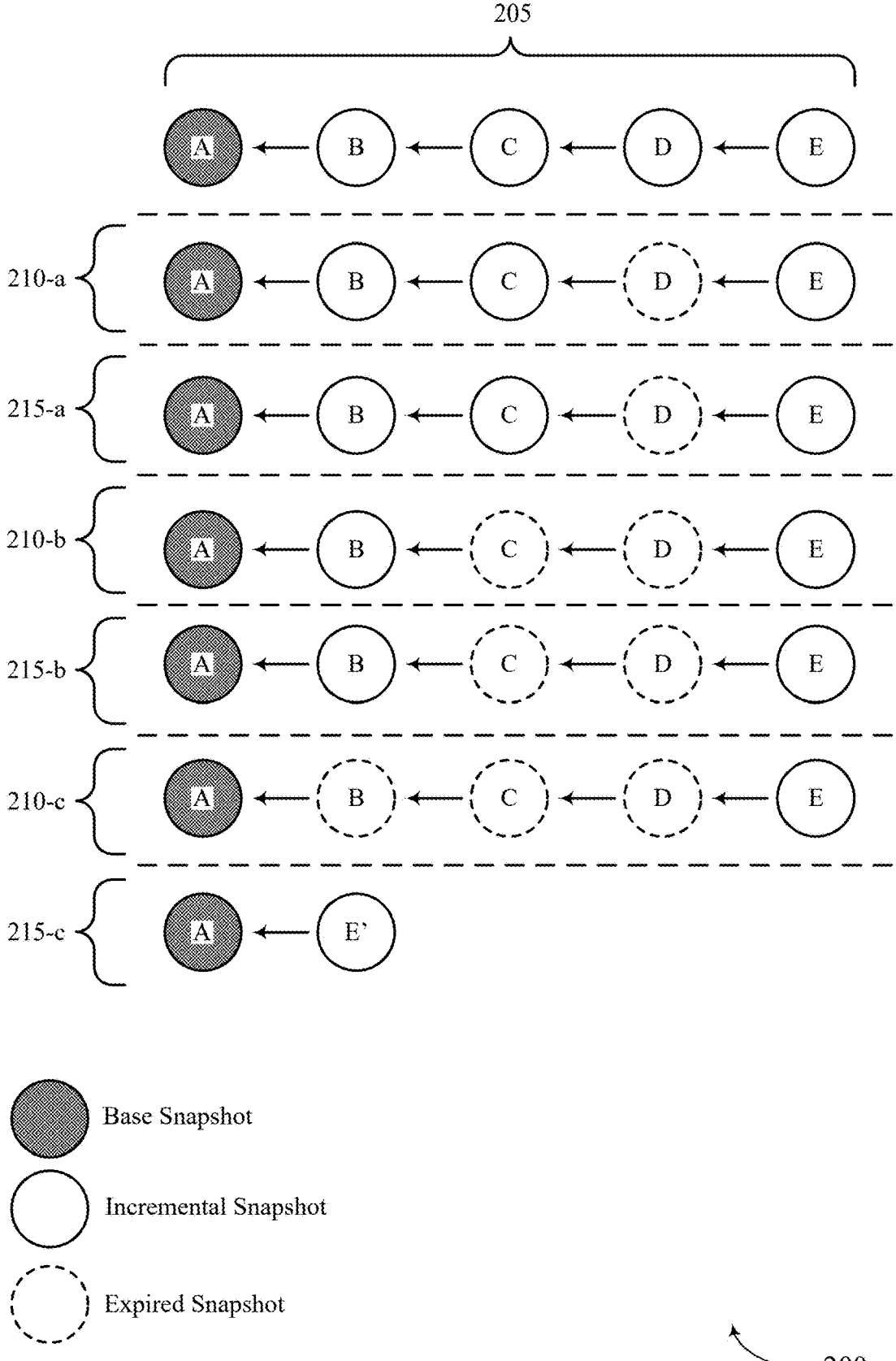
FIG. 2 shows an example of a snapshot cycle diagram that supports lightweight consolidation operation for storage space reclamation in accordance with aspects of the present disclosure.

FIG. 2 shows an example of a snapshot cycle diagram 200 that supports lightweight consolidation operation for storage space reclamation in accordance with aspects of the present disclosure. The snapshot cycle diagram 200 may implement or be implemented by aspects of the computing environment 100 described with reference to FIG. 1. For example, a DMS (e.g., a DMS 110 as described with reference to FIG. 1) may generate one or more snapshot chains that are subject to one or more expiration cycles 210 and one or more consolidation cycles 215. Each snapshot chain may include one or more snapshots, which may be examples of the snapshots 135 as described with reference to FIG. 1. Each snapshot chain may include a base snapshot A (also referred to as a full snapshot) and one or more incremental snapshots, such as incremental snapshots B, C, D, and E. Although the snapshot cycle diagram 200 illustrates a respective snapshot chain 205, it may be understood that the one or more expiration cycles 210 and the one or more consolidation cycles 215 may apply to any quantity of snapshot chains generated by the DMS 110 (e.g., simultaneously across all snapshot chains or with each snapshot chain having respective expiration and consolidation cycles).

Each snapshot in the snapshot chain 205 may expire (e.g., no longer be retained by the DMS) over time in accordance with a retention policy. For example, the DMS may generate a snapshot according to a first periodicity (e.g., each day, each week, each month, and the like) and the snapshot may expire in accordance with a second periodicity (e.g., retained for a day, week, month, or year after generation). The DMS may identify expired snapshots at each expiration cycle 210. For example, the DMS may identify expired incremental snapshot D at expiration cycle 210-*a*.

In some examples, when incremental snapshot D expires, data belonging to incremental snapshot D and shared with a next incremental snapshot, such as incremental snapshot E, may not be deleted (e.g., data set D) and data that belongs to incremental snapshot D and not shared with incremental snapshot E may be deleted (e.g., data set E). A full consolidation operation may identify the two sets of data (e.g., data set D and data set E) and write a new patch file for incremental snapshot E using the existing data of incremental snapshot E and the data set D. Accordingly, storage space used for storing the patch files for expired snapshot D and incremental snapshot E may be reclaimed (e.g., made available for subsequent patch files or other data). If there is no incremental snapshot in the snapshot chain 205 (e.g., no snapshot E), the patch file for the snapshot D may be freed up (e.g., removed from storage, marked available for data) based on performing the full consolidation operation. That is, the full consolidation operation may free-up storage space used by expired snapshots based on consolidating data in the expired snapshot that is shared with the next incremental snapshot and deleting both the unshared data and the patch file of the expired snapshot.

In some other examples, a DMS may perform a full consolidation operation at each consolidation cycle 215 (e.g., which may occur after each expiration cycle 210). However, performing the full consolidation operation for each consolidation cycle 215 may result in considerable disk byte utilization (e.g., as large as 70%), as the data in each snapshot is read and written into a consolidated patch file. That is, the DMS may read and write data in a snapshot multiple times to complete the full consolidation operation. Accordingly, it may be beneficial to minimize the disk utilization caused by frequent full consolidation operations.

The techniques described herein enable deferring the full consolidation operation for one or more consolidation cycles 215 based on one or more snapshot heuristics. That is, rather than perform a full consolidation operation at each consolidation cycle 215, the DMS may instead perform one or more lightweight consolidation operations based on the one or more heuristics. Data included in a snapshot may be distributed across one or more data stripes. A data stripe may be a set of physical blocks of data, where data blocks within the data stripe may be mapped to logical offsets within a logical address range. A lightweight consolidation operation may read a metadata file of an expired snapshot, which may indicate stripe IDs in the expired snapshot that are still reachable (e.g., not overwritten by any subsequent snapshot), and deletes all the unreachable stripes from the expired snapshot. In other words, the lightweight consolidation operation may delete the data that is not shared with any subsequent incremental snapshot without reading all of the data within the snapshot and without deleting the expired snapshot or writing data into a new file. In some examples, the DMS may attempt to perform the lightweight consolidation operation at each consolidation cycle 215.

For example, the DMS may identify that incremental snapshot D is expired at expiration cycle 210-*a*. Rather than perform a full consolidation operation for consolidation cycle 215-*a* (which may consolidate snapshot D and snapshot E), the DMS may perform a lightweight consolidation operation that deletes the unreachable stripes in expired snapshot D, but retains the data in snapshot D that is shared with incremental snapshot E. In another example, the DMS may identify that incremental snapshot C is expired during expiration cycle 210-*b*. In accordance with the techniques described herein, the DMS may perform the lightweight consolidation operation to delete unreachable stripes in expired snapshot C in the consolidation cycle 215-*b*. In each example, the DMS may delete unreachable stripes that correspond to unshared data in each of the expired snapshots, thereby reclaiming storage space from each of the expired snapshots without performing as many read or write operations compared to a full consolidation operation.

In some examples, the DMS may determine whether to perform the full consolidation operation in connection with an expiration cycle 210. For example, one or more reachable stripes may include physical blocks that are unused, which may be referred to as leaked space. The DMS may check the amount of leaked space against a leaked space threshold. If the leaked space exceeds the threshold, the DMS may perform the full consolidation operation. For example, the DMS may identify that the quantity of leaked space satisfies the leaked space threshold (e.g., exceeds the threshold) based on performing a consolidation operation on expired snapshot C (e.g., after expiration cycle 210-*c*). Based on the quantity of leaked space satisfying the leaked space threshold, the DMS may perform the full consolidation operation in consolidation cycle 215-*c*. If the quantity of leaked space does not satisfy the leaked space threshold, the DMS may perform a lightweight consolidation operation. Additionally, or alternatively, the DMS may perform the full consolidation operation if a length of the snapshot chain 205 satisfies a chain length threshold and if running the full consolidation operation would reduce the used space by a threshold amount (e.g., if the chain length is >10 and would reduce used space by >30% by running the full consolidate operation). That is, the DMS may attempt perform the lightweight consolidation operation at each consolidation cycle 215 and may perform a full consolidation operation if any of the trigger conditions (e.g., leaked space, chain length, storage space) are met as of a given expiration cycle 210.

Figure 3:
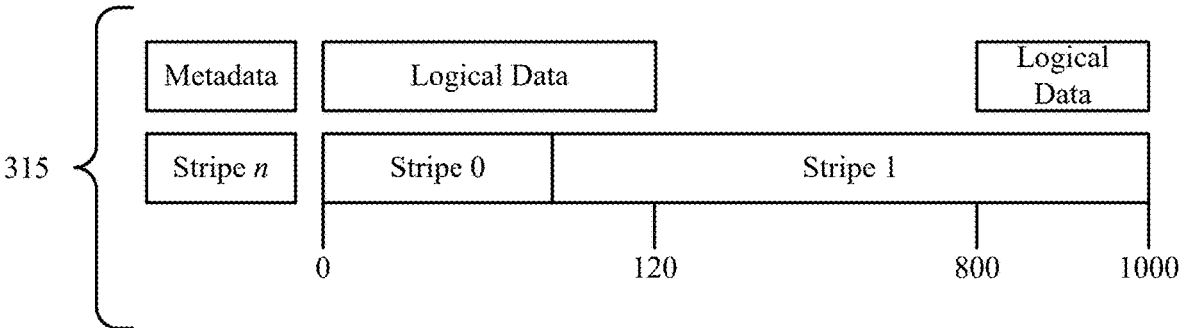
FIG. 3 shows examples of data stripe diagrams that support lightweight consolidation operation for storage space reclamation in accordance with aspects of the present disclosure.
Figure 3:
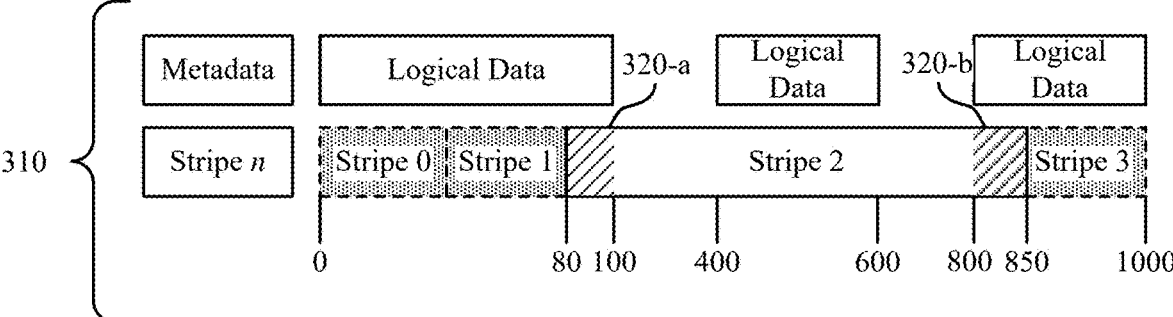
Figure 3:
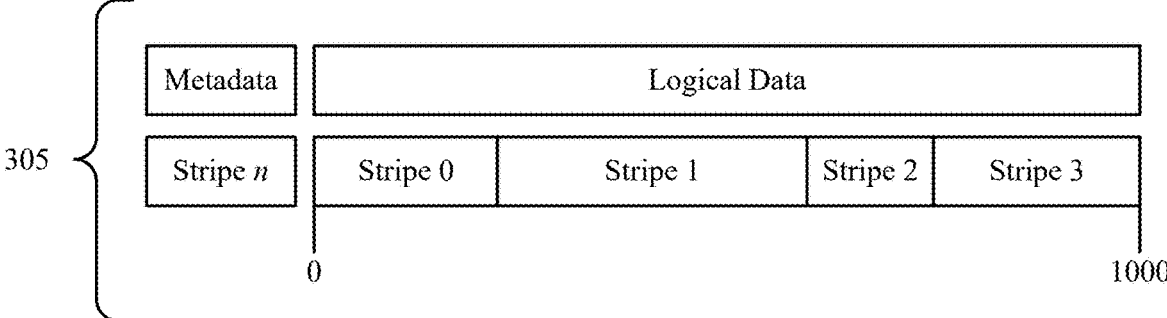

FIG. 3 shows examples of data stripe diagrams 300 that support lightweight consolidation operation for storage space reclamation in accordance with aspects of the present disclosure. The data stripe diagrams 300 may implement or be implemented by aspects of the computing environment 100 and the snapshot cycle diagram 200, as described with reference to FIGS. 1 and 2. For example, a DMS (e.g., a DMS 110 as described with reference to FIG. 1) may generate a base snapshot 305, a first incremental snapshot 310, and a second incremental snapshot 315. The base snapshot 305 and the incremental snapshots 310 and 315 may be examples of the snapshots 135 as described with reference to FIG. 1.

The base snapshot 305 may include logical data that is stored across one or more data stripes (e.g., across stripe 0, stripe 1, stripe 2, and stripe 3). Each data stripe may include a set of physical blocks of data with a static physical size, and the data blocks within the data stripe may be mapped to logical offsets within a logical address range. In some examples, the span of corresponding logical addresses corresponding to the data blocks within a data stripe may vary between data stripes. For example, the logical data in the base snapshot 305 may range from logical offset 0 to logical offset 1000 across data stripes 0, 1, 2, and 3. The first incremental snapshot 310 may include logical data that spans from logical offset 0 to logical offset 100, logical data that spans from logical offset 400 to logical offset 600, and logical data that spans from logical offset 800 to logical offset 1000 that overwrites portions of the corresponding ranges of logical offsets in the base snapshot 305. The second incremental snapshot 315 may include logical data that spans from logical offset 0 to logical offset 120 and logical data that spans from logical offset 800 to logical offset 1000 that overwrites the logical data in the corresponding offsets in the first incremental snapshot 310. Accordingly, data stripe 0 and data stripe 1 (e.g., which includes the logical data that spans from the logical offset 0 to logical offset 100), as well as data stripe 3 (e.g., which includes the logical data that spans from the logical offset 800 to the logical offset 1000) in the first incremental snapshot 310 may become unreachable (e.g., overwritten in newer patch files).

The DMS may identify an expiration of the first incremental snapshot 310 (e.g., at an expiration cycle 210 described with reference to FIG. 2). In some examples, the DMS may perform a lightweight consolidation operation (e.g., at a consolidation cycle 215) that deletes data stripe 0, data stripe 1, and data stripe 3 from the first incremental snapshot 310 because those stripes may not include any data shared with any subsequent incremental snapshot (e.g., the data may not be referenced by or relied upon by any subsequent incremental snapshots). Based on deleting the unreachable data stripes 0, 1, and 3, the DMS may reclaim physical storage space corresponding to the logical address range of logical offset 0 to logical offset 100 and the logical address range of logical offset 800 to logical offset 1000.

In some examples, the DMS may perform the lightweight consolidation operation based on performing one or more dry read operations. A dry read operation may read the metadata (e.g., patch file) of a snapshot without reading the data stored in the snapshot (e.g., logical data). That is, each of the snapshots 305, 310, and 315 may include metadata stored across one or more data stripes separate from the data stripes that store the logical data. Based on performing a dry read for a quantity of blocks (e.g., all of the blocks) in the expired first incremental snapshot 310, the DMS may obtain (identify) physical offsets of the expired patch file that are still reachable (e.g., the physical address range corresponding to the logical address range from logical offset 80 to logical offset 850). The physical offset to data stripe ID may have a one-to-one mapping based on the encoding type of the metadata (such as mirrored or Reed-Solomon encoding). The DMS may maintain a bitmap of the reachable stripes using the information from the dry read. Based on the bitmap, the DMS may delete the unreachable stripes (e.g., data stripe 0, data stripe 1, and data stripe 3) from the expired first incremental snapshot 310 during a lightweight consolidation operation. In some cases, data stripes that include index blocks may not be deleted.

In some examples, deleting unreachable data stripes may increase a quantity of leaked space 320 in the DMS. As described herein, leaked space may refer to a quantity of unused physical blocks of reachable data stripes in a snapshot. For example, data stripe 2 in the expired first incremental snapshot 310 may include leaked space 320-*a* that spans from logical offset 80 to logical offset 100 and leaked space 320-*b* that spans from logical offset 800 to logical offset 850. The DMS may generate the leaked space 320-*a* based on the logical data overwriting a range of logical addresses that span from logical offset 0 to logical offset 100 (e.g., which includes the logical address range of logical offset 80 to logical offset 100). The DMS may delete data stripes 0, 1, and 3 during the lightweight consolidation operation because those stripes may be unreachable. However, because data stripe 2 may still be reachable (e.g., data stripe 2 includes data shared with at least the second incremental snapshot 315), the overwritten logical address range from logical offset 80 to logical offset 100 and the logical address range of logical offset 800 to logical offset 850 may not be deleted during the lightweight consolidation operation, resulting in unused physical blocks corresponding to the overwritten logical address ranges.

In some examples, the DMS may perform a full consolidation operation based on the quantity of leaked space 320 satisfying a leaked space threshold. If the quantity of leaked space 320 does not satisfy the leaked space threshold, the DMS may perform a lightweight consolidation operation. Additionally, or alternatively, the DMS may perform a full consolidation operation if a snapshot chain length satisfies a chain length threshold and if performing the full consolidation operation would reclaim a threshold quantity of storage space (e.g., reclaim from the leaked space 320).

Figure 4:
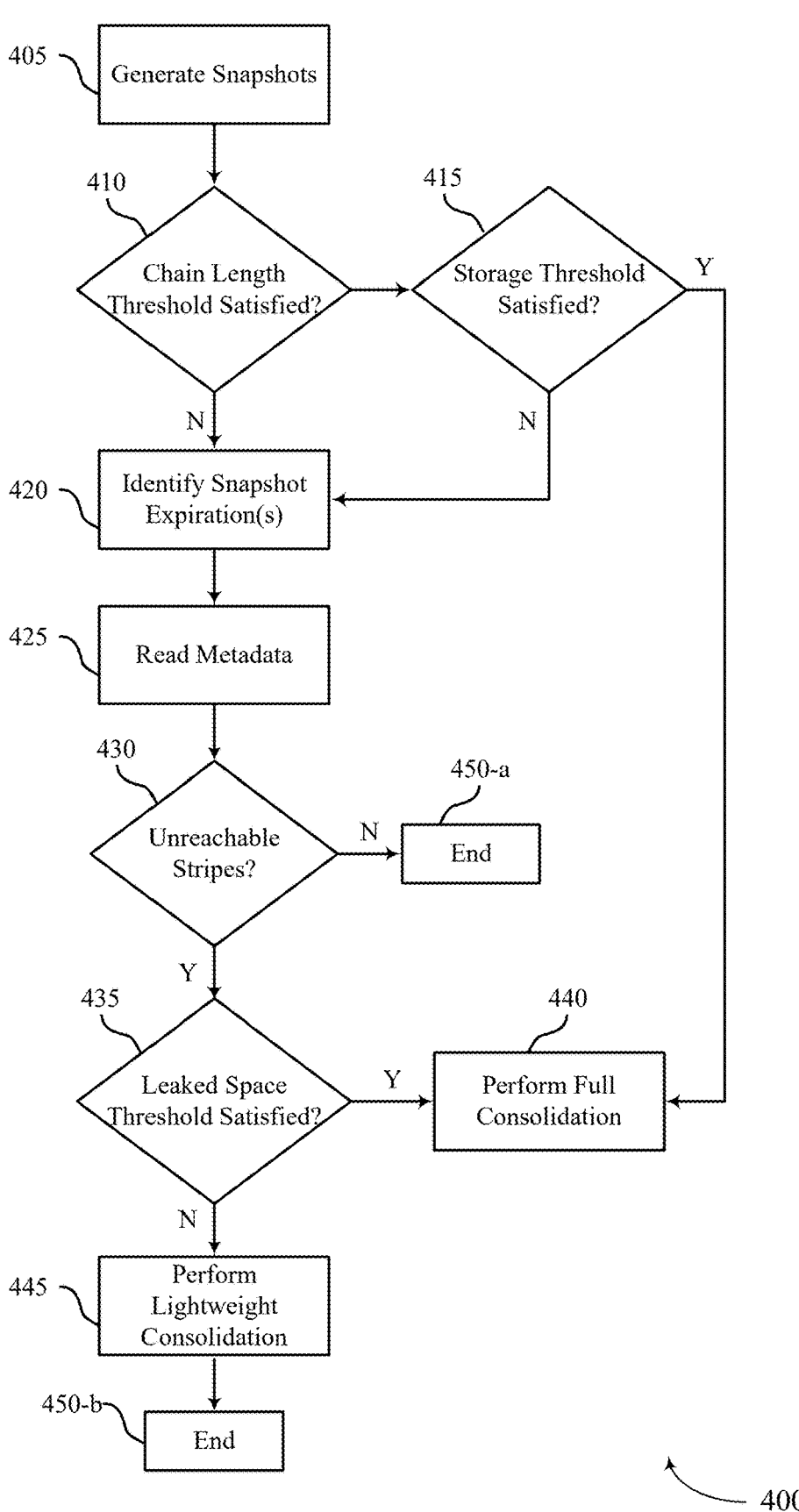
FIG. 4 shows an example of a process flow that supports lightweight consolidation operation for storage space reclamation in accordance with aspects of the present disclosure.

FIG. 4 shows an example of a process flow 400 that supports lightweight consolidation operation for storage space reclamation in accordance with aspects of the present disclosure. The process flow 400 may implement or be implemented by aspects of FIGS. 1-3. For example, the process flow 400 may be implemented by a DMS, such as the DMS 110 described with reference to FIG. 1. In some examples, the DMS may perform, or attempt to perform, the operations in the process flow 400 at each consolidation cycle 215, as described with reference to FIG. 2.

At 405, the DMS may generate multiple snapshots of a target computing object (e.g., the computing system 105 described with reference to FIG. 1). Each snapshot of the multiple snapshots may include data stored across one or more respective data stripes, as described further with reference to FIG. 3. In some examples, the DMS may generate one or more snapshot chains (e.g., the snapshot chain 205 described with reference to FIG. 2) based on generating the multiple snapshots. A respective snapshot chain may include a base snapshot and one or more incremental snapshots that include differential data relative to a previous snapshot in the respective snapshot chain. That is, an incremental snapshot may include data that is changed from the snapshot it depends upon (e.g., relies upon, references to).

At 410, the DMS may determine whether a length of a snapshot chain (e.g., a quantity of snapshots within a respective snapshot chain) satisfies a snapshot chain length threshold. If the snapshot chain length of a respective snapshot chain satisfies (e.g., is equal to or greater than) the snapshot chain length threshold, the DMS may proceed to determine whether a storage threshold is satisfied at 415. If a respective snapshot chain length does not satisfy the snapshot chain length threshold, the DMS may proceed to 420.

The storage threshold may correspond to a quantity of storage space in a storage environment for the snapshots that would become available if the DMS performed a full consolidation operation. For example, if performance of the full consolidation operation would reduce used storage space in the storage environment (e.g., leaked space) by at least the storage threshold (e.g., >30% of the storage), the DMS may perform the full consolidation operation at 445. If performing the full consolidation operation would not reduce used storage space in the storage environment by at least the storage threshold, the DMS may proceed to 420. In some examples, the DMS may adjust the storage threshold based on a quantity of available storage space in the storage environment satisfying a second storage threshold. For example, the storage threshold may begin at a first value (e.g., >20%), and the DMS may adjust the storage threshold to a second value (e.g., >30%) based on a quantity of available space in the storage environment satisfying the second storage threshold (e.g., >20% until the storage environment is 50% full).

At 420, the DMS may identify an expiration of a first snapshot from among the multiple snapshots (e.g., a first snapshot in a first snapshot chain). In some examples, the first snapshot may correspond to a first state of the target computing object as of a first point in time, and the first snapshot may include data stored across one or more first data stripes.

At 425, the DMS may read, based on the expiration of the first snapshot, metadata corresponding to the first snapshot (e.g., the patch file for the first snapshot). The metadata may indicate that at least one data stripe from among the one or more first data stripes was entirely overwritten (e.g., became unreachable) by a second snapshot corresponding to a second state of the target computing object as of a second point in time. The first snapshot chain may include the second snapshot (e.g., the second snapshot may be an incremental snapshot relative to the first snapshot).

At 430, the DMS may determine whether the first snapshot (e.g., the expired snapshot) includes unreachable data stripes based on reading the metadata. If the first snapshot does not include any unreachable data stripes, the DMS may exit the process flow 400 at 450-*a*. If the first snapshot includes at least one unreachable data stripe, the DMS may proceed to 435.

At 435, the DMS may determine whether a quantity of leaked space satisfies a leaked space threshold. The quantity of leaked space may correspond to a ratio of a quantity of available first data stripes of the one or more first data stripes to a quantity of the one or more first data stripes. That is, the leaked space may correspond to a percentage of unused physical blocks of reachable data stripes to total physical blocks of remaining (e.g., retained, reachable) data stripes of a patch file of a snapshot. In some examples, a lightweight consolidation operation may output a quantity of leaked space that may be freed up (e.g., made available for storage in the storage environment) based on performing a full consolidation operation. Additionally, or alternatively, the DMS may store accessible physical address ranges in a cache for the last n data stripes encountered (e.g., for the last n data stripes whose metadata was read during the lightweight consolidation operation). When a data stripe is evicted from the cache (e.g., based on reading data stripe n+1), the quantity of leaked space may be incremented.

If the quantity of leaked space satisfies the leaked space threshold, the DMS may proceed to 440. If the quantity of leaked space does not satisfy the leaked space threshold, the DMS may proceed to 445. In some examples, the DMS may adjust the leaked space threshold based on a quantity of available free space in the storage environment. For example, the leaked space threshold may begin at a first value (e.g., 20%) until the storage environment satisfies a threshold (e.g., becomes 50% full). The leaked space threshold may decrease (e.g., reduce to 0) as the quantity of available storage space decreases (e.g., as the storage environment becomes 90% full).

At 440, the DMS may perform a full consolidation operation. The full consolidation operation may generate a third snapshot that includes the data in the first snapshot and data in the second snapshot and deletes the first snapshot and the second snapshot. In some examples, the DMS may perform the full consolidation operation based on the quantity of leaked space satisfying the leaked space threshold. Additionally, or alternatively, the DMS may perform the full consolidation operation based on the chain length of the first snapshot chain satisfying the chain length threshold and based on the storage threshold being satisfied.

At 445, the DMS may perform a lightweight consolidation operation based on the at least one first data stripe being entirely overwritten by the second snapshot (e.g., based on the first snapshot including at least one unreachable data stripe). In some examples, the DMS may perform the lightweight consolidation operation based on the quantity of leaked space not satisfying the leaked space threshold. The lightweight consolidation operation may delete the at least one first data stripe that was entirely overwritten by the second snapshot while retaining at least one other first data stripe that was not entirely overwritten by the second snapshot (e.g., the lightweight consolidation operation may retain reachable data stripes in the first snapshot). In some examples, there may be multiple expired contiguous snapshots. In such examples, unreachable data stripes in each of the expired snapshots may be deleted based on data shared with the next unexpired snapshot. That is, any data stripes that include data not shared with the next unexpired snapshot may be deleted during the lightweight consolidation operation. In some examples, the lightweight consolidation operation may apply to a storage tree. For example, the DMS may read the metadata for each branch of the storage and delete the intersection of unreachable data stripes.

In some examples, the DMS may add, as part of the lightweight consolidation operation, one or more markers to the metadata of the first snapshot indicating to delete the at least one first data stripe that was entirely overwritten. The DMS may scan, in accordance with a periodicity, the metadata for the one or more markers, and the DMS may delete the at least one first data stripe based on scanning the metadata and detecting the one or more markers. For example, when a data stripe is deleted, a marker may be added in the metadata and chunks corresponding to the data may be deleted from the storage environment. The DMS may perform the scan (e.g., a metadata scan) to detect whether the marker is present. If the marker is present, the chunks of the data stripe may be missing. If the marker is not present, the chunks may be deleted. After performing the lightweight consolidation operation, the DMS may exit the process flow at 450-*b*.

Figure 5:
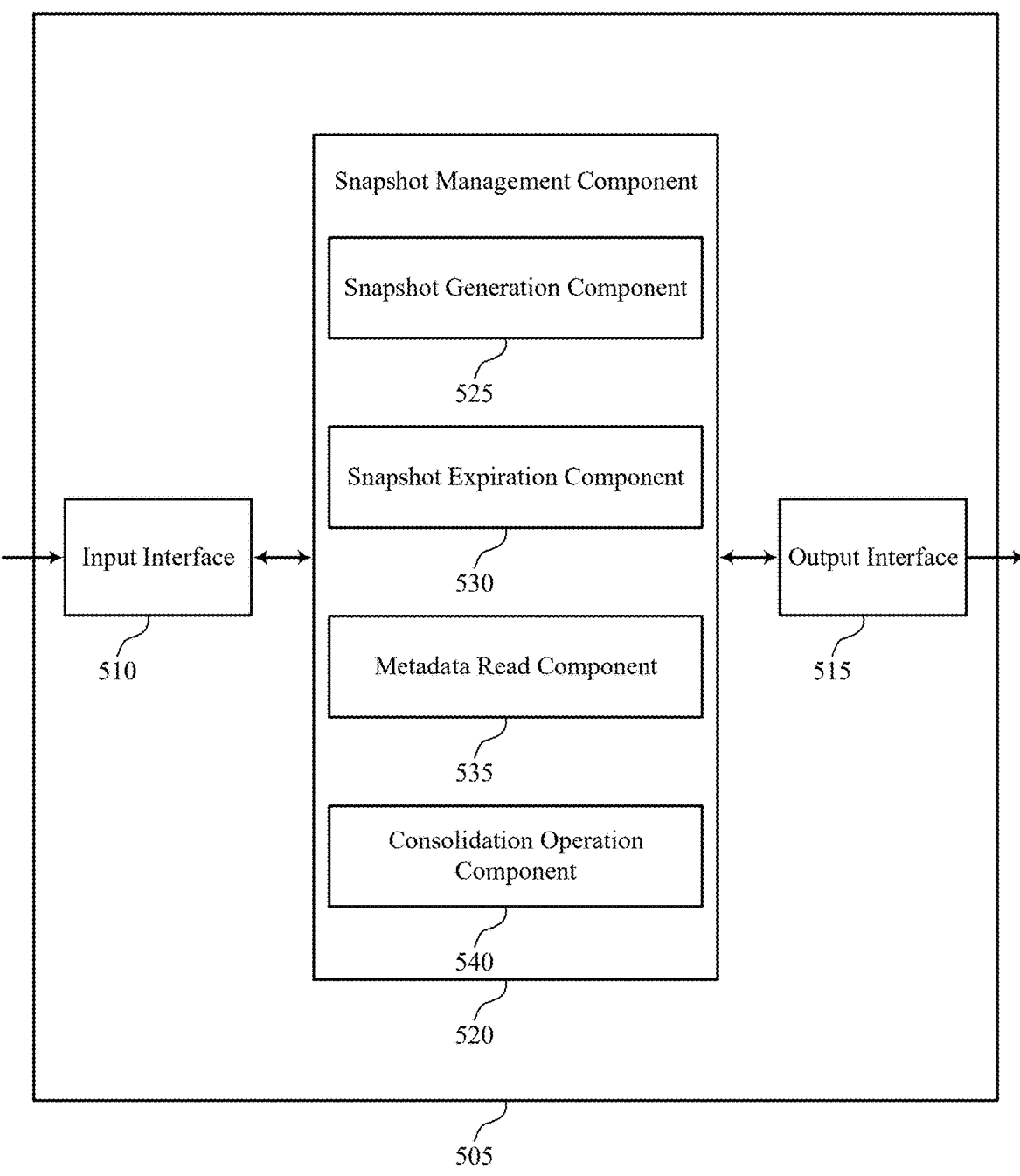
FIG. 5 shows a block diagram of an apparatus that supports lightweight consolidation operation for storage space reclamation in accordance with aspects of the present disclosure.

FIG. 5 shows a block diagram 500 of a system 505 that supports lightweight consolidation operation for storage space reclamation in accordance with aspects of the present disclosure. In some examples, the system 505 may be an example of aspects of one or more components described with reference to FIG. 1, such as a DMS 110. The system 505 may include an input interface 510, an output interface 515, and a snapshot management component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the snapshot management component 520 to support lightweight consolidation operation for storage space reclamation. In some cases, the input interface 510 may be a component of a network interface 725 as described with reference to FIG. 7.

The output interface 515 may manage output signaling for the system 505. For example, the output interface 515 may receive signaling from other components of the system 505, such as the snapshot management component 520, and may transmit such output signaling corresponding to (e.g., representative of or otherwise based on) such signaling to other systems or devices. In some cases, the output interface 515 may be a component of a network interface 725 as described with reference to FIG. 7.

For example, the snapshot management component 520 may include a snapshot generation component 525, a snapshot expiration component 530, a metadata read component 535, a consolidation operation component 540, or any combination thereof. In some examples, the snapshot management component 520, or various components thereof, may be configured to perform various operations (e.g., receiving, monitoring, transmitting) using or otherwise in cooperation with the input interface 510, the output interface 515, or both. For example, the snapshot management component 520 may receive information from the input interface 510, send information to the output interface 515, or be integrated in combination with the input interface 510, the output interface 515, or both to receive information, transmit information, or perform various other operations as described herein.

The snapshot generation component 525 may be configured as or otherwise support a means for generating a set of multiple snapshots of a target computing object, each snapshot of the set of multiple snapshots including data stored across one or more respective data stripes. The snapshot expiration component 530 may be configured as or otherwise support a means for identifying an expiration of a first snapshot from among the set of multiple snapshots, the first snapshot corresponding to a first state of the target computing object as of a first point in time, and the first snapshot including data stored across one or more first data stripes. The metadata read component 535 may be configured as or otherwise support a means for reading, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time. The consolidation operation component 540 may be configured as or otherwise support a means for performing, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot.

Figure 6:
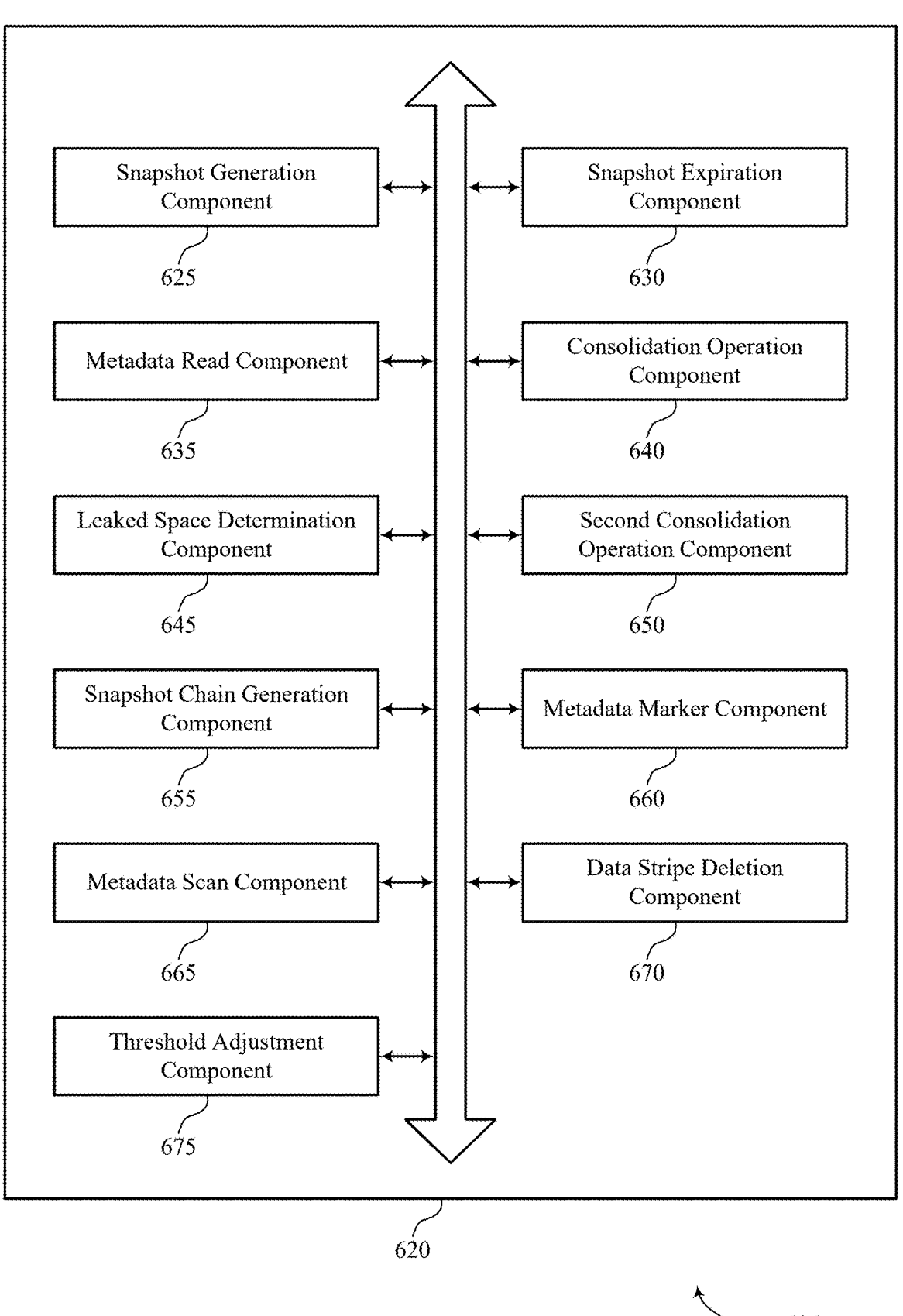
FIG. 6 shows a block diagram of a snapshot management component that supports lightweight consolidation operation for storage space reclamation in accordance with aspects of the present disclosure.

FIG. 6 shows a block diagram 600 of a snapshot management component 620 that supports lightweight consolidation operation for storage space reclamation in accordance with aspects of the present disclosure. The snapshot management component 620 may be an example of aspects of a snapshot management component or a snapshot management component 520, or both, as described herein. The snapshot management component 620, or various components thereof, may be an example of means for performing various aspects of lightweight consolidation operation for storage space reclamation as described herein. For example, the snapshot management component 620 may include a snapshot generation component 625, a snapshot expiration component 630, a metadata read component 635, a consolidation operation component 640, a leaked space determination component 645, a second consolidation operation component 650, a snapshot chain generation component 655, a metadata marker component 660, a metadata scan component 665, a data stripe deletion component 670, a threshold adjustment component 675, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot generation component 625 may be configured as or otherwise support a means for generating a set of multiple snapshots of a target computing object, each snapshot of the set of multiple snapshots including data stored across one or more respective data stripes. The snapshot expiration component 630 may be configured as or otherwise support a means for identifying an expiration of a first snapshot from among the set of multiple snapshots, the first snapshot corresponding to a first state of the target computing object as of a first point in time, and the first snapshot including data stored across one or more first data stripes. The metadata read component 635 may be configured as or otherwise support a means for reading, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time. The consolidation operation component 640 may be configured as or otherwise support a means for performing, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot.

In some examples, the leaked space determination component 645 may be configured as or otherwise support a means for determining a quantity of leaked space, the quantity of leaked space associated with a ratio of a quantity of available first data stripes of the one or more first data stripes to a total quantity of the one or more first data stripes. In some examples, the second consolidation operation component 650 may be configured as or otherwise support a means for performing, based on the quantity of leaked space satisfying a threshold, a second consolidation operation that generates a third snapshot that includes the data in the first snapshot and data in the second snapshot and deletes the first snapshot and the second snapshot.

In some examples, the threshold is based on a quantity of available storage space in a storage environment for the set of multiple snapshots. In some examples, the threshold adjustment component 675 may be configured as or otherwise support a means for adjusting the threshold based on the quantity of available storage space satisfying a second threshold.

In some examples, the snapshot chain generation component 655 may be configured as or otherwise support a means for generating one or more snapshot chains based on generating the set of multiple snapshots, a respective snapshot chain including a base snapshot and one or more incremental snapshots that include differential data relative to a previous snapshot in the respective snapshot chain, where a first snapshot chain includes the first snapshot and the second snapshot. In some examples, the second consolidation operation component 650 may be configured as or otherwise support a means for performing, based on a chain length of the first snapshot chain satisfying a threshold length, a second consolidation operation that generates a third snapshot that includes the data in the first snapshot and data in the second snapshot and deletes the first snapshot and the second snapshot. In some examples, performance of the second consolidation operation is further based on a threshold quantity of available storage space in a storage environment for the set of multiple snapshots.

In some examples, the metadata marker component 660 may be configured as or otherwise support a means for adding, as part of the consolidation operation, one or more markers to the metadata indicating to delete the at least one first data stripe that was entirely overwritten based on reading the metadata. In some examples, the metadata scan component 665 may be configured as or otherwise support a means for scanning, in accordance with a periodicity, the metadata for the one or more markers. In some examples, the data stripe deletion component 670 may be configured as or otherwise support a means for deleting the at least one first data stripe based on scanning the metadata and detecting the one or more markers.

Figure 7:
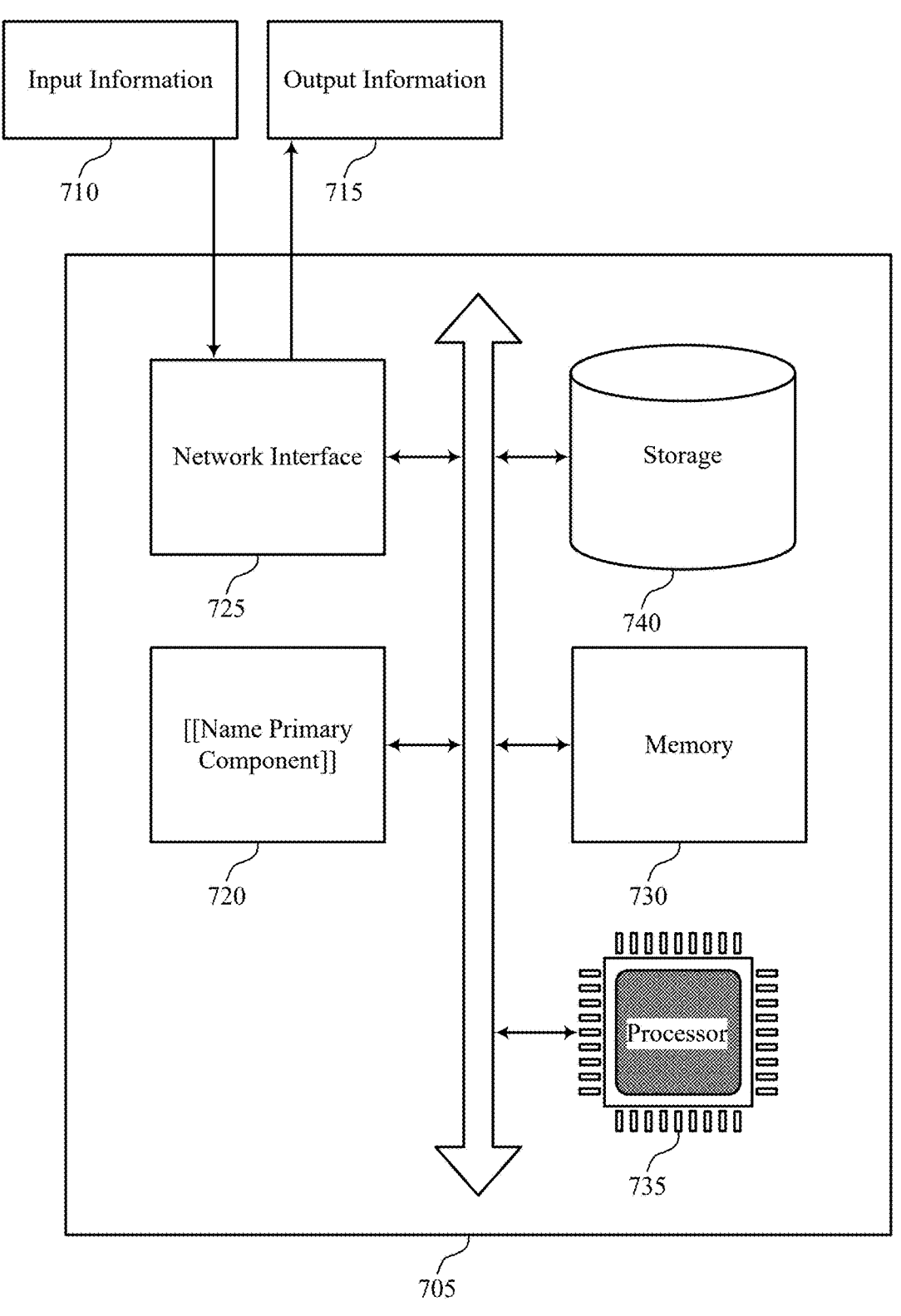
FIG. 7 shows a diagram of a system including a device that supports lightweight consolidation operation for storage space reclamation in accordance with aspects of the present disclosure.

FIG. 7 shows a block diagram 700 of a system 705 that supports lightweight consolidation operation for storage space reclamation in accordance with aspects of the present disclosure. The system 705 may be an example of or include components of a system 505 as described herein. The system 705 may include components for data management, including components such as a snapshot management component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting lightweight consolidation operation for storage space reclamation). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the snapshot management component 720 may be configured as or otherwise support a means for generating a set of multiple snapshots of a target computing object, each snapshot of the set of multiple snapshots including data stored across one or more respective data stripes. The snapshot management component 720 may be configured as or otherwise support a means for identifying an expiration of a first snapshot from among the set of multiple snapshots, the first snapshot corresponding to a first state of the target computing object as of a first point in time, and the first snapshot including data stored across one or more first data stripes. The snapshot management component 720 may be configured as or otherwise support a means for reading, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time. The snapshot management component 720 may be configured as or otherwise support a means for performing, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot.

By including or configuring the snapshot management component 720 in accordance with examples as described herein, the system 705 may support techniques for lightweight consolidation operation for storage space reclamation, which may provide one or more benefits such as, for example, reduced latency, more efficient utilization of computing resources, increased storage space, among other possibilities.

FIG. 8 shows a flowchart illustrating a method 800 that supports lightweight consolidation operation for storage space reclamation in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include generating a set of multiple snapshots of a target computing object, each snapshot of the set of multiple snapshots including data stored across one or more respective data stripes. The operations of 805 may be performed in accordance with examples as disclosed herein. In some examples, aspects of the operations of 805 may be performed by a snapshot generation component 625 as described with reference to FIG. 6.

At 810, the method may include identifying an expiration of a first snapshot from among the set of multiple snapshots, the first snapshot corresponding to a first state of the target computing object as of a first point in time, and the first snapshot including data stored across one or more first data stripes. The operations of 810 may be performed in accordance with examples as disclosed herein. In some examples, aspects of the operations of 810 may be performed by a snapshot expiration component 630 as described with reference to FIG. 6.

At 815, the method may include reading, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time. The operations of 815 may be performed in accordance with examples as disclosed herein. In some examples, aspects of the operations of 815 may be performed by a metadata read component 635 as described with reference to FIG. 6.

At 820, the method may include performing, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot. The operations of 820 may be performed in accordance with examples as disclosed herein. In some examples, aspects of the operations of 820 may be performed by a consolidation operation component 640 as described with reference to FIG. 6.

FIG. 9 shows a flowchart illustrating a method 900 that supports lightweight consolidation operation for storage space reclamation in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include generating a set of multiple snapshots of a target computing object, each snapshot of the set of multiple snapshots including data stored across one or more respective data stripes. The operations of 905 may be performed in accordance with examples as disclosed herein. In some examples, aspects of the operations of 905 may be performed by a snapshot generation component 625 as described with reference to FIG. 6.

At 910, the method may include identifying an expiration of a first snapshot from among the set of multiple snapshots, the first snapshot corresponding to a first state of the target computing object as of a first point in time, and the first snapshot including data stored across one or more first data stripes. The operations of 910 may be performed in accordance with examples as disclosed herein. In some examples, aspects of the operations of 910 may be performed by a snapshot expiration component 630 as described with reference to FIG. 6.

At 915, the method may include reading, based on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time. The operations of 915 may be performed in accordance with examples as disclosed herein. In some examples, aspects of the operations of 915 may be performed by a metadata read component 635 as described with reference to FIG. 6.

At 920, the method may include performing, based on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot. The operations of 920 may be performed in accordance with examples as disclosed herein. In some examples, aspects of the operations of 920 may be performed by a consolidation operation component 640 as described with reference to FIG. 6.

At 925, the method may include determining a quantity of leaked space, the quantity of leaked space associated with a ratio of a quantity of available first data stripes of the one or more first data stripes to a total quantity of the one or more first data stripes. The operations of 925 may be performed in accordance with examples as disclosed herein. In some examples, aspects of the operations of 925 may be performed by a leaked space determination component 645 as described with reference to FIG. 6.

At 930, the method may include performing, based on the quantity of leaked space satisfying a threshold, a second consolidation operation that generates a third snapshot that includes the data in the first snapshot and data in the second snapshot and deletes the first snapshot and the second snapshot. The operations of 930 may be performed in accordance with examples as disclosed herein. In some examples, aspects of the operations of 930 may be performed by a second consolidation operation component 650 as described with reference to FIG. 6.

The following provides an overview of aspects of the present disclosure:

Aspect 1: A method, comprising: generating a plurality of snapshots of a target computing object, each snapshot of the plurality of snapshots comprising data stored across one or more respective data stripes; identifying an expiration of a first snapshot from among the plurality of snapshots, the first snapshot corresponding to a first state of the target computing object as of a first point in time, and the first snapshot comprising data stored across one or more first data stripes; reading, based at least in part on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time; and performing, based at least in part on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot.

Aspect 2: The method of aspect 1, further comprising: determining a quantity of leaked space, the quantity of leaked space associated with a ratio of a quantity of available first data stripes of the one or more first data stripes to a total quantity of the one or more first data stripes; and performing, based at least in part on the quantity of leaked space satisfying a threshold, a second consolidation operation that generates a third snapshot that includes the data in the first snapshot and data in the second snapshot and deletes the first snapshot and the second snapshot.

Aspect 3: The method of aspect 2, wherein the threshold is based at least in part on a quantity of available storage space in a storage environment for the plurality of snapshots.

Aspect 4: The method of aspect 3, further comprising: adjusting the threshold based at least in part on the quantity of available storage space satisfying a second threshold.

Aspect 5: The method of any of aspects 1 through 4, further comprising: generating one or more snapshot chains based at least in part on generating the plurality of snapshots, a respective snapshot chain comprising a base snapshot and one or more incremental snapshots that include differential data relative to a previous snapshot in the respective snapshot chain, wherein a first snapshot chain comprises the first snapshot and the second snapshot; and performing, based at least in part on a chain length of the first snapshot chain satisfying a threshold length, a second consolidation operation that generates a third snapshot that includes the data in the first snapshot and data in the second snapshot and deletes the first snapshot and the second snapshot.

Aspect 6: The method of aspect 5, wherein performance of the second consolidation operation is further based at least in part on a threshold quantity of available storage space in a storage environment for the plurality of snapshots.

Aspect 7: The method of any of aspects 1 through 6, further comprising: adding, as part of the consolidation operation, one or more markers to the metadata indicating to delete the at least one first data stripe that was entirely overwritten based at least in part on reading the metadata;

scanning, in accordance with a periodicity, the metadata for the one or more markers; and deleting the at least one first data stripe based at least in part on scanning the metadata and detecting the one or more markers.

Aspect 8: An apparatus comprising one or more memories storing processor-executable code, and one or more processors coupled with the one or more memories and individually or collectively operable to execute the code to cause the apparatus to perform a method of any of aspects 1 through 7.

Aspect 9: An apparatus comprising at least one means for performing a method of any of aspects 1 through 7.

Aspect 10: A non-transitory computer-readable medium storing code the code comprising instructions executable by one or more processors to perform a method of any of aspects 1 through 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

generating a plurality of snapshots of a target computing object, each snapshot of the plurality of snapshots comprising data stored across one or more respective data stripes;

identifying an expiration of a first snapshot from among the plurality of snapshots, the first snapshot corresponding to a first state of the target computing object as of a first point in time, and the first snapshot comprising data stored across one or more first data stripes;

reading, based at least in part on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time;

performing, based at least in part on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot;

determining a quantity of leaked space, the quantity of leaked space associated with a ratio of a quantity of available first data stripes of the one or more first data stripes to a total quantity of the one or more first data stripes; and performing, based at least in part on the quantity of leaked space satisfying a threshold, a second consolidation operation that generates a third snapshot that includes the data in the first snapshot and data in the second snapshot and deletes the first snapshot and the second snapshot.

2. The method of claim 1, wherein the threshold is based at least in part on a quantity of available storage space in a storage environment for the plurality of snapshots.

3. The method of claim 2, further comprising:

adjusting the threshold based at least in part on the quantity of available storage space satisfying a second threshold.

4. The method of claim 1, further comprising:

generating one or more snapshot chains based at least in part on generating the plurality of snapshots, a respective snapshot chain comprising a base snapshot and one or more incremental snapshots that include differential data relative to a previous snapshot in the respective snapshot chain, wherein a first snapshot chain comprises the first snapshot and the second snapshot; and performing, based at least in part on a chain length of the first snapshot chain satisfying a threshold length, a third consolidation operation that generates a fourth snapshot that includes the data in the first snapshot and the data in the second snapshot and deletes the first snapshot and the second snapshot.

5. The method of claim 4, wherein performance of the second consolidation operation is further based at least in part on a threshold quantity of available storage space in a storage environment for the plurality of snapshots.

6. The method of claim 1, further comprising:

adding, as part of the consolidation operation, one or more markers to the metadata indicating to delete the at least one first data stripe that was entirely overwritten based at least in part on reading the metadata;

scanning, in accordance with a periodicity, the metadata for the one or more markers; and deleting the at least one first data stripe based at least in part on scanning the metadata and detecting the one or more markers.

7. An apparatus, comprising:

one or more memories storing processor-executable code; and one or more processors coupled with the one or more memories and individually or collectively operable to execute the code to cause the apparatus to:

generate a plurality of snapshots of a target computing object, each snapshot of the plurality of snapshots comprising data stored across one or more respective data stripes;

identify an expiration of a first snapshot from among the plurality of snapshots, the first snapshot corresponding to a first state of the target computing object as of a first point in time, and the first snapshot comprising data stored across one or more first data stripes;

read, based at least in part on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time;

perform, based at least in part on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot;

determine a quantity of leaked space, the quantity of leaked space associated with a ratio of a quantity of available first data stripes of the one or more first data stripes to a total quantity of the one or more first data stripes; and perform, based at least in part on the quantity of leaked space satisfying a threshold, a second consolidation operation that generates a third snapshot that includes the data in the first snapshot and data in the second snapshot and deletes the first snapshot and the second snapshot.

8. The apparatus of claim 7, wherein the threshold is based at least in part on a quantity of available storage space in a storage environment for the plurality of snapshots.

9. The apparatus of claim 8, wherein the one or more processors are individually or collectively further operable to execute the code to cause the apparatus to:

adjust the threshold based at least in part on the quantity of available storage space satisfying a second threshold.

10. The apparatus of claim 7, wherein the one or more processors are individually or collectively further operable to execute the code to cause the apparatus to:

generate one or more snapshot chains based at least in part on generating the plurality of snapshots, a respective snapshot chain comprising a base snapshot and one or more incremental snapshots that include differential data relative to a previous snapshot in the respective snapshot chain, wherein a first snapshot chain comprises the first snapshot and the second snapshot; and perform, based at least in part on a chain length of the first snapshot chain satisfying a threshold length, a third consolidation operation that generates a fourth snapshot that includes the data in the first snapshot and the data in the second snapshot and deletes the first snapshot and the second snapshot.

11. The apparatus of claim 10, wherein performance of the second consolidation operation is further based at least in part on a threshold quantity of available storage space in a storage environment for the plurality of snapshots.

12. The apparatus of claim 7, wherein the one or more processors are individually or collectively further operable to execute the code to cause the apparatus to:

add, as part of the consolidation operation, one or more markers to the metadata indicating to delete the at least one first data stripe that was entirely overwritten based at least in part on reading the metadata;

scan, in accordance with a periodicity, the metadata for the one or more markers; and delete the at least one first data stripe based at least in part on scanning the metadata and detecting the one or more markers.

13. A non-transitory computer-readable medium storing code, the code comprising instructions executable by one or more processors to:

generate a plurality of snapshots of a target computing object, each snapshot of the plurality of snapshots comprising data stored across one or more respective data stripes;

identify an expiration of a first snapshot from among the plurality of snapshots, the first snapshot corresponding to a first state of the target computing object as of a first point in time, and the first snapshot comprising data stored across one or more first data stripes;

read, based at least in part on the expiration of the first snapshot, metadata corresponding to the first snapshot, the metadata indicating that at least one first data stripe from among the one or more first data stripes was entirely overwritten by a second snapshot corresponding to a second state of the target computing object as of a second point in time;

perform, based at least in part on the at least one first data stripe being entirely overwritten by the second snapshot, a consolidation operation that deletes the at least one first data stripe that was entirely overwritten by the second snapshot while retaining at least one other first data stripe that was not entirely overwritten by the second snapshot;

determine a quantity of leaked space, the quantity of leaked space associated with a ratio of a quantity of available first data stripes of the one or more first data stripes to a total quantity of the one or more first data stripes; and perform, based at least in part on the quantity of leaked space satisfying a threshold, a second consolidation operation that generates a third snapshot that includes the data in the first snapshot and data in the second snapshot and deletes the first snapshot and the second snapshot.

14. The non-transitory computer-readable medium of claim 13, wherein the threshold is based at least in part on a quantity of available storage space in a storage environment for the plurality of snapshots.

15. The non-transitory computer-readable medium of claim 14, wherein the instructions are further executable by the one or more processors to:

adjust the threshold based at least in part on the quantity of available storage space satisfying a second threshold.

16. The non-transitory computer-readable medium of claim 13, wherein the instructions are further executable by the one or more processors to:

generate one or more snapshot chains based at least in part on generating the plurality of snapshots, a respective snapshot chain comprising a base snapshot and one or more incremental snapshots that include differential data relative to a previous snapshot in the respective snapshot chain, wherein a first snapshot chain comprises the first snapshot and the second snapshot; and perform, based at least in part on a chain length of the first snapshot chain satisfying a threshold length, a third consolidation operation that generates a fourth snapshot that includes the data in the first snapshot and the data in the second snapshot and deletes the first snapshot and the second snapshot.

17. The non-transitory computer-readable medium of claim 13, wherein the instructions are further executable by the one or more processors to:

add, as part of the consolidation operation, one or more markers to the metadata indicating to delete the at least one first data stripe that was entirely overwritten based at least in part on reading the metadata;

scan, in accordance with a periodicity, the metadata for the one or more markers; and delete the at least one first data stripe based at least in part on scanning the metadata and detecting the one or more markers.

* * * * *